Patented Oct. 20, 1936

2,058,178

UNITED STATES PATENT OFFICE 2,058,178

METHOD OF EXAMINING THE STATE OF CRYSTALLIZATION OF CALCINED ALUMINUM OXIDE

Reinhold Reichmann, Berlin, Germany, assignor to Siemens & Halske, Aktiengesellschaft, Siemensstadt, near Berlin, Germany, a corporation of Germany No Drawing. Application January 3, 1933, Serial No. 650,051. In Germany November 18, 1932

2 Claims. (Cl. 23—230)

My invention relates to a method of examining the state of crystallization of calcined non-plastic metallic oxides.

It has been found in some cases when manufacturing shaped bodies of non-plastic metallic oxides according to the method of molding by using a casting slip activated with acid that the removal of the moisture could not be accomplished in a uniform manner. The method hitherto employed has the drawback that the mass hardens too rapidly with the result that cavities are formed in the bodies, causing collapse on removing them from the mold or difficulties incident to the removal. Cracks and fissures may form particularly in cases requiring a mold with a core. Flaws and faults may occur during subsequent baking even in the case of bodies which are removed from the mold without apparent trouble. Such bodies contain flaws or contract as a result of an irregular shrinkage or they are not completely compact.

The reason for this behavior is the following:

The calcined metallic oxides on the market are not always quite uniform. If the material, for instance, aluminum oxide is roasted or fired at a low temperature so that it consists substantially of gamma corundum, the material is equally unsuitable for the method of molding as if it were fired at a high temperature and would consist of alpha corundum. Tests have shown that the best results may be obtained, if the material is in a transition state, i. e., passes over from gamma corundum into alpha corundum.

Tests carried out by the microscopic method to investigate this state have not been successful; not even with the aid of Röntgen diagrams or by determinating the losses due to firing or the hygroscopicity, the specific weight or the weight by volume.

According to the invention, the property inherent in non-plastic metallic oxides to form colored bodies with the aid of organic pigments. The oxides absorb the pigment in a more or less different manner depending upon their state of crystallization so that the state of crystallization may be determined by the intensity of the coloring.

In the case of alumina a treatment with alizarin red has been proposed. In this case a madder lacquer known to those skilled in the art of dyeing is formed. To this end, an aqueous solution of alizarin red is prepared by solving, for instance, 2 grams of alizarin red in 1 litre of water. The material to be tested is immersed in a portion of this solution which is then stirred for about half an hour. The coloring takes place during this time. After the solid parts have been withdrawn from the solution and dried either a complete coloring of all particles or a partial coloring of the individual particles to a greater or lesser extent may be observed with the aid of a microscope depending upon the kind of material. Since it has been further found that the oxides calcined at high temperatures do not color, as for instance, alpha corundum in the case of alumina, whereas the material fired at a low temperature assumes an intense color which corresponds to gamma corundum in the case of alumina, this method of coloring constitutes a reliable method for determining the state of crystallization of the metallic oxides to be treated.

It is also possible to determine the quantity expressed in percentage of the best suitable oxides in the following manner:

The colored oxide is filtered off from the suspension and the filtrate is placed in a colorimeter in which the filtrate is compared with an untreated pigment solution of the same initial concentration.

The difference in color of the two solutions is proportional to the percentage of the oxide examined with respect to the best suitable oxide, for instance, gamma corundum in the transition state, and may be numerically determined by comparing it to a standard sample.

By mixing different oxides, it is possible to select the most suitable mixing proportion for the desired purpose so that reliable results for the manufacture of shaped bodies made of non-plastic metallic oxides are attained with certainty.

I claim as my invention:—

1. Method of examining the state of crystallization of calcined alumina, which comprises dissolving alizarin red in water, immersing the substance to be tested into the solution, stirring the solution so long as to cause a coloring of the substance to be tested, removing the solid parts from the solution, drying them and testing microscopically the intensity of the coloring.

2. The method of examining the state of crystallization of calcined aluminum oxide, which comprises dissolving alizarin red in water to form a test solution, immersing said oxide in the solution, agitating the solution containing said oxide to cause coloring of the oxide particles, removing the colored oxide from said solution by filtering and comparing the filtered solution with a test solution of substantially the same initial pigment concentration as the first noted test solution to determine the pigment absorption of said oxide.

REINHOLD REICHMANN.